W. T. SKILLING.
SOLAR ILLUMINATING AND PROJECTING APPARATUS.
APPLICATION FILED MAY 17, 1909.

951,850.

Patented Mar. 15, 1910.

WITNESSES:
B. T. Davenport
C Carter, Jr.

INVENTOR.
William T. Skilling
BY
A. B. Bowman
ATTORNEY.

UNITED STATES PATENT OFFICE.

WILLIAM T. SKILLING, OF SAN DIEGO, CALIFORNIA.

SOLAR ILLUMINATING AND PROJECTING APPARATUS.

951,850. Specification of Letters Patent. Patented Mar. 15, 1910.

Application filed May 17, 1909. Serial No. 496,530.

*To all whom it may concern:*

Be it known that I, WILLIAM T. SKILLING, a citizen of the United States, residing at San Diego, in the county of San Diego and State of California, have invented a new and useful Solar Illuminating and Projecting Apparatus, of which the following is a specification.

My invention relates to an apparatus for illuminating projecting and reflecting a picture or object to be shown, and in such connection it relates more particularly to means for illuminating a picture or object to be shown, the object being to illuminate a picture preparatory to projection by means of the sun's rays, which gives a bright, efficient and economical illumination.

The principal objects of my invention are therefore, first, to provide an apparatus that is simple and economical in construction, second, that it is simple of operation, third, the parts are so connected that the adjustment is simple, and fourth, the plurality of mirrors gives an even and intense illumination. The nature and scope of my invention will be more fully understood from the following description taken in connection with the accompanying drawings, forming a part hereof in which—

Figure 1:
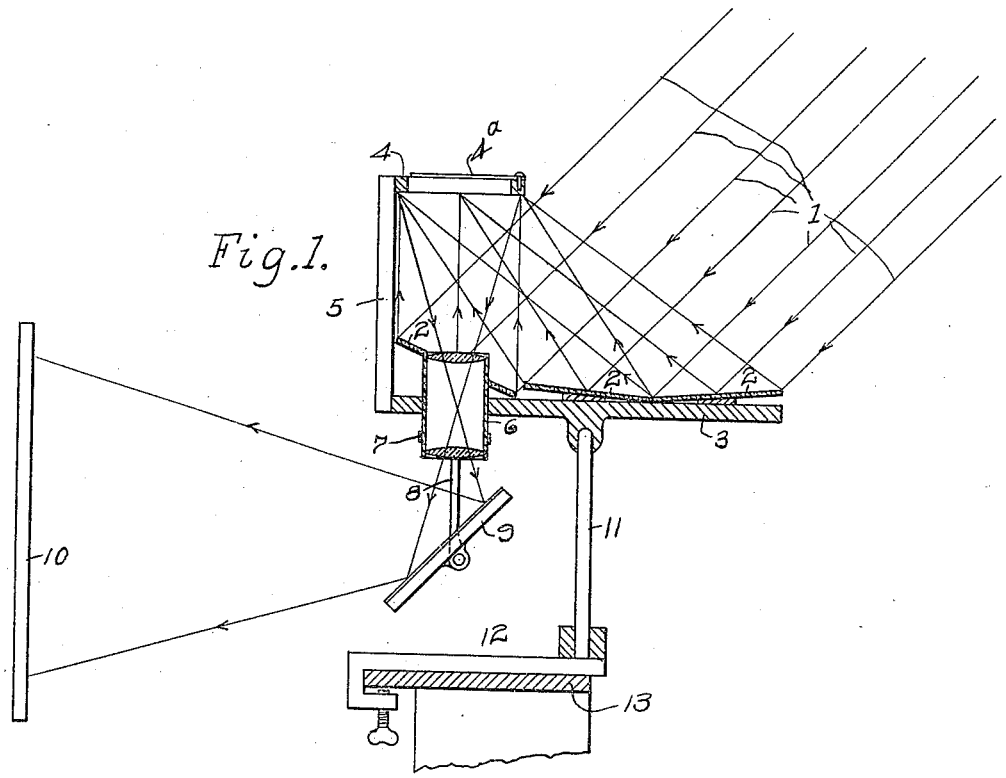
Figure 2:
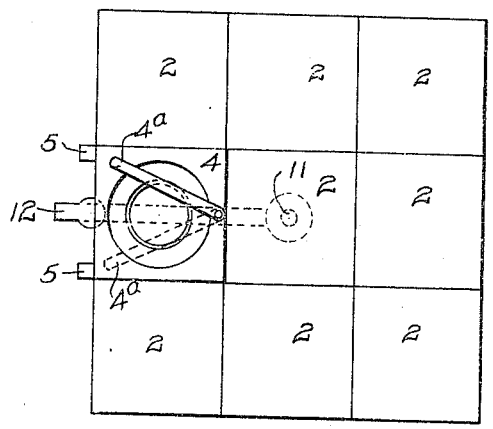

Figure 1 is a diagrammatic view in side elevation and partly in section of the apparatus embodying my invention; and Fig. 2 is a plan view of the apparatus and showing some of the under parts by dotted lines.

Similar characters of reference refer to similar parts throughout the several views.

Referring to the drawings, 1 represents the direct rays of light from the sun, which connect with a plurality of mirrors 2. In this case, I have shown eight, said mirrors 2 are mounted rigidly upon a solid rectangular base 3 as shown best in Fig. 1 and each mirror is so mounted on an angle as to cause the rays of light when striking the surface of the mirrors to concentrate upon a picture frame 4 which is rigidly attached to the base 3 a short distance above said base 3 and upon the opposite side from which the light comes, by means of two extending arms 5. Directly under said picture frame 4 on said base 3 is adjustably mounted a double lens 6 and extending through said base and adapted to be adjusted lengthwise. Around the lens 6 is loosely fitted a band 7 adapted to turn around said lens and to which is attached a projecting arm 8 which projects downward and supports pivotally another mirror 9, this band 7 is made to slip around the lens so the mirror 9 may be turned in different directions so as to always throw the reflection on the screen 10. The base 3 is pivoted centrally upon a post 11 so that said base with all its connected parts may be tilted up and down and the post 11 is revolubly pivoted upon an extension clamp 12, said clamp being adapted to clamp on the inside of a window sill and extend outward. The window sill I have illustrated by numeral 13.

It can be readily seen that with this construction, the mirrors can be collectively adjusted to the position desired to reflect the rays of light upon the picture or object which is placed on top of the picture frame 4 and fastened there by means of a spring clip 4ª which is adapted to be turned in various positions over said picture or object as shown in dotted lines in Fig. 2. The mirrors are all mounted so that when the sun's rays come at an angle of approximately 45 degrees to the picture frame plane, the light from all the mirrors reflects to the picture, when in this position, light falling around the picture frame, casts a shadow on the braces 5 which is marked and acts as an index, so that whenever the apparatus is set in such a position that the shadow is cast in the same place, then all the mirrors reflect the light onto the picture, causing very brilliant illumination.

It can be readily seen that this is a much quicker and more satisfactory method than if each mirror had to be adjusted separately. By this construction, an image of the picture or object thus illuminated may be projected upon the screen 10, by the objective lens 6, but in order to reverse the picture from right to left, I place the other mirror 9 between the objective lens 6 and the screen 10, said mirror is placed at an angle adapted to reflect the picture reversed upon the screen. By proper adjustment of the objective lens 6, the image may be focused upon the screen.

Having thus described my invention what I claim as new and desire to secure by Letters Patent is—

1. An illuminating and projecting apparatus, comprising, a plurality of mirrors, a flat base upon which said mirrors are rigidly mounted, said mirrors being so arranged as to reflect and condense rays of light from the sun upon a picture or other object, a frame rigidly attached to and over said base, upon which said picture or object is placed, a spring for holding said picture or object in place, an adjustable objective lens rigidly attached to said base, another mirror attached to said objective lens and pivotally mounted for receiving the image of the picture or object, a post with a friction joint to allow the tilting of said base, said post being set into a hole adapted to allow said base to revolve and means for attaching said apparatus to a window sill, all substantially as set forth.

2. An illuminating and projecting apparatus comprising, a plurality of mirrors, a flat base upon which said mirrors are rigidly attached, each of said mirrors being so arranged as to reflect light from the sun over the whole of the picture or object, a frame rigidly attached to and over said base upon which said picture or object is placed, a spring for holding said picture or object in place, an adjustable objective lens rigidly attached to said base and adapted to receive the light reflected from the picture or object, another mirror attached to said objective lens and pivotally mounted for receiving the image of the picture or object, a post with a friction joint to allow the tilting of said base, said post being set into a hole adapted to allow said base to revolve and means for attaching said apparatus to a window sill, all substantially as set forth.

In testimony whereof I have signed my name to this specification in the presence of two subscribing witnesses.

WILLIAM T. SKILLING.

Witnesses:
ABRAM B. BOWMAN,
CLAUD T. DAVENPORT.